(12) United States Patent
Allen, III

(10) Patent No.: US 7,111,738 B2
(45) Date of Patent: Sep. 26, 2006

(54) TECHNIQUE FOR ENHANCING THE EFFECTIVENESS OF SLURRIED DENSE MEDIA SEPARATIONS

(75) Inventor: Laurence E. Allen, III, San Rafael, CA (US)

(73) Assignee: MBA Polymers, Inc., Richmond, CA (US)

(*) Notice: Subject to any disclaimer, the term of this patent is extended or adjusted under 35 U.S.C. 154(b) by 0 days.

(21) Appl. No.: 10/775,613

(22) Filed: Feb. 9, 2004

(65) Prior Publication Data

US 2004/0164005 A1  Aug. 26, 2004

Related U.S. Application Data

(63) Continuation of application No. PCT/US03/22920, filed on Jul. 22, 2003.

(60) Provisional application No. 60/397,808, filed on Jul. 22, 2002.

(51) Int. Cl.
  *B04C 5/02*  (2006.01)
  *B07C 5/36*  (2006.01)

(52) U.S. Cl. .................. 209/172; 209/173; 209/724; 209/725; 209/734; 209/172.5

(58) Field of Classification Search ............... 209/172, 209/173, 172.5, 174
See application file for complete search history.

(56) References Cited

U.S. PATENT DOCUMENTS

| | | | | |
|---|---|---|---|---|
| 5,794,791 A * | 8/1998 | Kindig | ................ | 209/727 |
| 5,819,945 A * | 10/1998 | Laskowski et al. | ............ | 209/2 |
| 5,894,996 A * | 4/1999 | Williams | .................. | 241/20 |
| 5,948,276 A * | 9/1999 | Neureither et al. | ......... | 210/772 |
| 6,335,376 B1 * | 1/2002 | Allen et al. | ................ | 521/40.5 |
| 2004/0004033 A1 * | 1/2004 | Vandeputte | ................ | 209/509 |

* cited by examiner

*Primary Examiner*—Joseph Rodriguez
*Assistant Examiner*—Jonathan R Miller
(74) *Attorney, Agent, or Firm*—Fish & Richardson P.C.

(57) ABSTRACT

Methods, systems, and media for use in separating mixtures. A slurry including a separation liquid and one or more particulate media materials is provided. A classification separation is performed on the slurry to produce a classified media having a controlled particle size distribution of the particulate media materials. The classified media is combined with a mixture to be separated to generate a separation mixture. A density separation is performed on the separation mixture. The particle size distribution can be controlled based in part on characteristics of components of a separation system to be used in subsequent density separations.

17 Claims, 3 Drawing Sheets

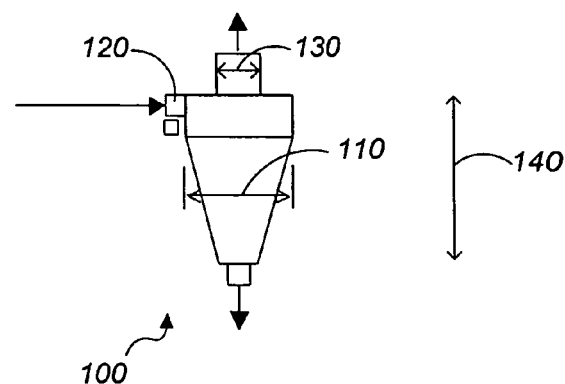
Fig._1
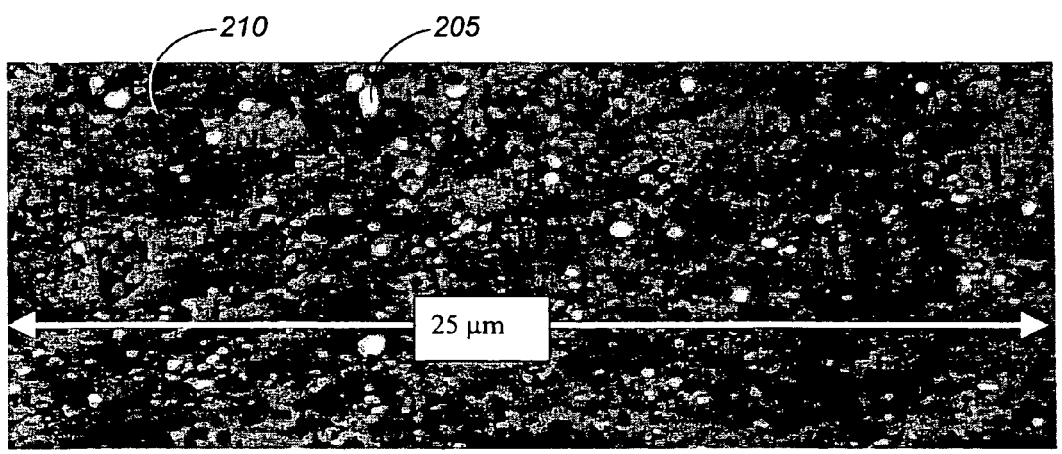
Fig._2A
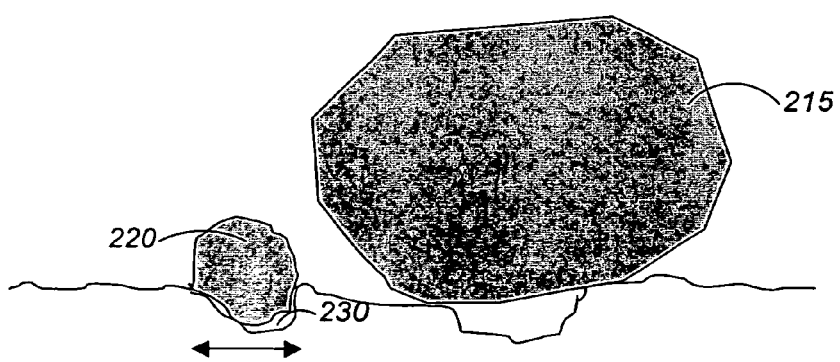
Fig._2B

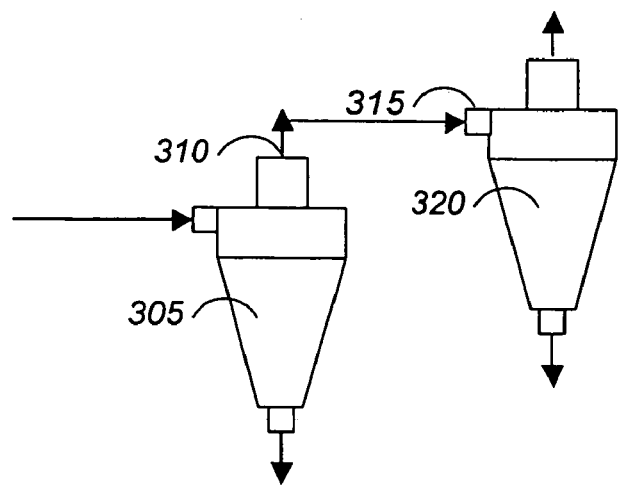
Fig._3
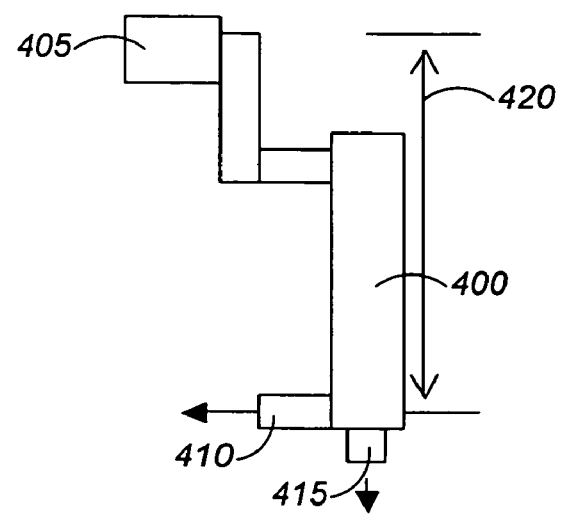
Fig._4

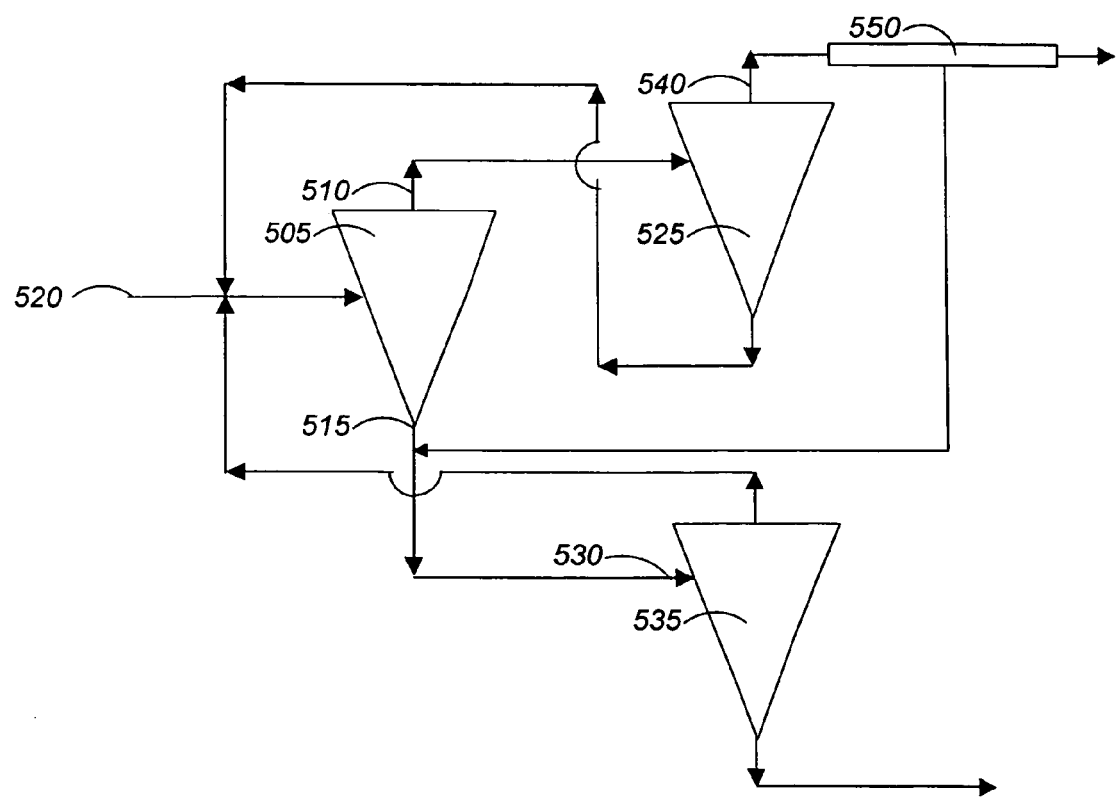
Fig._5

TECHNIQUE FOR ENHANCING THE EFFECTIVENESS OF SLURRIED DENSE MEDIA SEPARATIONS

CROSS-REFERENCE TO RELATED APPLICATIONS

This application is a continuation of International Application No. US03/22920, filed Jul. 22, 2003, which claims priority to U.S. Provisional Application No. 60/397,808, filed Jul. 22, 2002, which are incorporated by reference herein.

TECHNICAL FIELD

This invention relates to material separations and recycling plastics.

BACKGROUND

The problem of separating different polymeric materials from each other is the primary obstacle to economically recycling polymeric materials from durable goods. Three main separation techniques currently exist: hand sorting, optical/spectroscopic based sorting, and mechanical sorting based primarily on differences in material density. Hand sorting is labor intensive and cost-prohibitive in most cases. Optical-based sorting techniques, which include visible, near-infrared, ultraviolet, and X-ray fluorescence, have many applications, and these systems will certainly play a role in future recycling plants as described, for example, in commonly assigned International Application No. PCT/US03/11642, filed Apr. 14, 2003, which is incorporated herein by reference. However, no system available today is broadly applicable to polymeric materials containing fillers, paints, coatings, and other contaminants. Mechanical sorting systems take advantage of physical property differences between materials to segregate them. The most common physical property that these techniques exploit is a difference in material density.

Density sorting is used to upgrade a variety of raw materials including mixed plastics, coal and mixed metals. It is frequently necessary to perform these separations in a fluid with a density greater than that of water. The density of a fluid can be increased by adding a solid material (which will be referred to as "media",) to the fluid to create a slurry. Magnetite, titanium dioxide, sand, ferrosilicate or other materials are frequently added to water to adjust the density upwards so that material with a density as high as 2.6 g/cc or higher can be made to float. Separations making use of such slurried media will be referred to as "slurried dense media separations".

A hydrocyclone or other density separation device can be used to separate materials by density. Some density separation devices introduce liquid and particles that are to be separated (mixture particles) into a conical or cylindrical device. A vortex is created within the device causing the particles that are denser than the liquid to report to the bottom of the device (the underflow) and particles that are less dense than the liquid to report to the top of the device (the overflow). When using a separation fluid that is a slurry of dense mineral materials in water, the slurry can be unstable and subject to settling. The media particles used to increase the density of the fluid should be small enough that they will not settle as rapidly as the particles of the mixture to be separated. For example, if magnetite is used as a media, the particle size must typically be smaller than 200 microns to ensure that the magnetite does not settle so rapidly that the fluid does not behave as a dense fluid. A number of density separation devices are described in commonly-assigned U.S. Pat. No. 6,238,579, which is incorporated by reference herein.

In addition to separating mixtures of particles, hydrocyclones can also be used to dewater solids and classify solids by size. FIG. 1 illustrates the configuration of a typical hydrocyclone 100. The particle size of solid that a hydrocyclone is capable of recovering from a slurry is determined by a combination of variables, including the cyclone diameter 110, the inlet area 120, the diameter of the vortex finder 130, the height of the classification section 140, the flow rate of feed into the cyclone, the density of the solid particles in the slurry and the density of the separation fluid.

SUMMARY

The invention provides techniques for improving density separation performance by using slurried dense media having a controlled particle size distribution. The particle size distribution is controlled by classifying the slurried media to remove fines that are generally under a specified size, and to remove coarse particles that are over a specified size—that is, the portion of the slurry that is concentrated in the underflow of the separation device. The size of the media particles that are concentrated in the underflow changes with different separation circuits. Either of these classifications can be repeated to increase the overall removal of the fine or coarse particles.

In general, in one aspect, the invention features methods and systems for separating a mixture. A slurry is provided, including a separation liquid and one or more particulate media materials. A classification separation is performed on the slurry to produce a classified media having a controlled particle size distribution of the particulate media materials. The classified media is combined with a mixture to be separated to generate a separation mixture. A density separation is performed on the separation mixture.

Particular implementations can include one or more of the following features. The classified media can be regenerated after performing one or more density separations. The classification separation can include separating a coarse fraction and a fine fraction from the slurry. The coarse fraction and/or the fine fraction can be determined by the parameters of the separation system. A coarse fraction can be added into the slurry before a first density separation. Multiple density separations can be performed on the slurry or the separation mixture using one or more hydrocyclone separators, one or more cylindrical vortex separators, or a combination of hydrocyclone and cylindrical vortex separators. The media can include magnetite, titanium dioxide, sand or ferrosilicate. The mixture to be separated can include plastic materials. The media can be magnetite, and the particle size distribution of a classified slurry can be from about 5 to 30 microns or 5 to 25 microns. The system for the separation can include a first density separator, a second density separator, a third density separator and a dewatering screener. The dewatering screener can be coupled to the second density separator to extract a liquid. The second density separator can be fed by the first density separator. The third density separator can be fed by the first density separator as well as with the extracted liquid. The slurried media can include one or more material that have a size distribution between two particles size thresholds. The thresholds can be determined by the characteristics of the components of the density separation system.

In general, in another aspect, the invention provides a method for separating a mixture. A mixture is separated in a first density separator to generate a first fraction and a second fraction. The first fraction is separated in a second density separator to generate a third fraction. Liquid is recovered from the third fraction, and the recovered liquid and the second fraction are combined. The second fraction is then separated in a third density separator.

In general, in another aspect, the invention provides a system for separating a mixture of particles. The system includes a first density separator having a first exit port and a second exit port, a second density separator fed by the first exit port of the first density separator, a third density separator fed by the second exit port of the first density separator, and a dewatering screener coupled to an exit port of the second density separator. The dewatering screener is configured to remove liquid from a product exiting the exit port of the second density separator, such that at least a portion of the removed liquid is fed into the third density separator.

Particular implementations can include one or more of the following features. Separating the first fraction in a second density separator can include generating the third fraction and a fourth fraction, where the third fraction includes a larger amount of liquid than the fourth fraction. The first density separator can be a hydrocyclone and the second and third density separators can be cylindrical vortex separators. The first density separator can be a cylindrical vortex separator and the second and third density separators can be hydrocyclone separators. The system can include a single pump operably coupled to the first, second and third density separators.

In general, in another aspect, the invention provides a density-adjusting media for use in slurried media density separations of a mixture of materials using a density separation system. The media includes a particulate composition of one or more materials. The particulate composition consists of particles having a particle size distribution between a first particle size threshold and a second particle size threshold. The first and second particle size thresholds are selected based at least in part on characteristics of components of the density separation. In particular implementations, the media can include magnetite, titanium dioxide, sand or ferrosilicate. The media can be magnetite, and the particle size distribution of a classified slurry can be from about 5 to 30 microns or 5 to 25 microns.

In general, in another aspect, the invention provides multistage separation systems that use two or more density separators to separate materials in a mixture. The multistage systems can include multiple hydrocyclone separators, cylindrical vortex separators or other density separators, including combinations of these.

Particular embodiments can include one or more of the following features. The first density separator in the system can be a hydrocyclone, and the overflow and/or underflow of the hydrocyclone can be fed into a second hydrocyclone or a cylindrical vortex separator. The multistage systems can be used with water alone as a separation fluid or with salt solutions or a slurried particulate solid media. The slurried media can be classified to provide a controlled particle size distribution. The controlled particle size distribution can exclude media particles having a particle size greater less than a first particle size threshold and/or less than a second particle size threshold. The classified media can be used to control a two stage separation at approximately the same separation density in two or more density separators arranged in series. After the classified media has been prepared, a very coarse fraction of particulate media can be selectively introduced that will be substantially removed from the fluid in the first density separator. The classified media with a very coarse material added can be used to control a three-way separation. A system including two hydrocyclones in series followed by a cylindrical vortex separator can be used to produce a dense, medium dense and light product. The process can be controlled based on the feed density of the second hydrocyclone and the apex diameter of the first hydrocyclone. The cylindrical vortex separator can be fed by a headbox.

A subsequent two-stage separation can be performed on both the heavy and the light products using a hydrocyclone as the first stage and either hydrocyclones or cylindrical vortex separators as the second stage overflow and underflow separators. The cylindrical vortex can be used to dewater the light portion of the mixture particles and slurry combination to a greater extent than a hydrocyclone, which tends to dewater the heavy products. Dewatering the larger exiting fluid stream from the second stage overflow-fed separator and sending that fluid to the second stage underflow-fed head box enables separation at the same density to be performed in each separator. A multistage system that feeds the less dense fluid from a secondary density separator along with the more dense fluid fed into another secondary separator can be adjusted to provide feeds into each separator of approximately the same density. The multistage system can be provided with fewer than a single pump for each separator. For example, the multistage system can be provided with only a single pump for the entire multistage system.

A rinse water system can be used to remove the finer particles by automatically diverting a portion of the overflow of a separate rinse water cleaning hydrocyclone. The rinse water system precipitates an acceptable media from the slurry and creates an overflow fluid fraction which contains only very fine media particles and an underflow fraction which concentrates the mediated fluid for return to the main separation feed tank, returning the media to the process. The rinse water can be used to spray the mixture particles in order to liberate more of the media from the wet solids. The separation circuit itself can be used to remove coarse particles if diversion valves are placed on the underflow of the separation cyclone or cyclones.

The system can be used to initially classify the media particles and to remove fine or coarse particles that accumulate in the liquid once the media has been used. This allows for reuse of the media. Removing unwanted particles, such as fines, using the techniques described below does not require the media to be ferromagnetic and the method does not restrict a user to a narrow range of types of media.

The invention can be implemented to provide one or more of the following advantages. Removing fine media particles (generally less than 5 microns) improves separation performance by decreasing the viscosity of the fluid, and decreasing foaming. Foaming traps air in the slurry causing pressure fluctuations that destabilize the separator. Removing fine media particles also results in cleaner particles in the separated material, because fine media particles contaminate the surface of the mixture particles and reduce abrasive cleaning of the mixture particle surface that otherwise occurs during separation. Removing fine particles of media also contributes to cleanliness and hygiene in the mixture treatment facility, by reducing the amount of media that can become airborne within the facility.

Removing coarse media particles improves separation performance because the media particles do not concentrate in the underflow of the separation cyclone, which concentration makes density sorting less precise. Removing coarse particles from the media stabilizes the media, so that the media separates the particle mixture at a density closer to that of the feed density. The separation device or devices can be used to separate the mixture of particles, and to refine the quality of the media slurry before or during the separation by selecting the media particles to fall within a target range. Because the separation devices can serve two purposes, less equipment is needed to optimize this separation process. Classifying the media using the same conditions and equipment configuration that will be used to perform the subsequent separations can yield a classified media that will operate satisfactorily in a subsequent separation without regard to the particular materials present in the media and without requiring that the particle size thresholds be known. In such cases, the media classification can be determined entirely by the separation conditions and the equipment configuration used in the classification.

The use of a multistage system can improve the performance of a separation. A multistage system in which the overflow of a first hydrocyclone is fed to a cylindrical vortex separator requires only slightly more vertical clearance than a single stage system, and only a slightly greater pump pressure. Such a system can improve the precision of separation and reduce the need to dewater the separation products, since a portion of the water is removed from either the overflow or the underflow of the separation. This can assist in producing high purity light products from raw materials, which contain a variable or low quantity of light material in the feed.

The use of a cylindrical vortex separator in a multistage system can improve the precision of the medium density removal from the light product. A cylindrical vortex also dewaters the light portion of the mixture particles and slurry combination to a greater extent than a hydrocyclone, which tends to dewater the heavy products. Dewatering the larger exiting fluid stream from the second stage overflow-fed separator and sending that fluid to the second stage underflow-fed head box enables separation at the same density to be applied to each separator. This fluid transfer technique eliminates or greatly reduces the problem of higher fluid density on the second stage underflow separator. A multistage system that adds the less dense fluid recovered from a secondary separator to a more dense feed into another secondary separator decreases the density of that feed, and makes it possible to adjust the feed density such that the feed into each separator in a multistage separation system is of approximately the same density. This reduces the need to monitor and control the slurry feed into each separator. This can also eliminate the need for each separator to have a dedicated pump, simplifying the system and reducing capital expenses. In some embodiments only a single pump is required for the entire multistage system.

These techniques can be used to separate a variety of particles, including mixed plastics, mixed minerals and mixed metals, or any mixture of these materials.

The details of one or more embodiments of the invention are set forth in the accompanying drawings and the description below. Unless otherwise defined, all technical and scientific terms used herein have the meaning commonly understood by one of ordinary skill in the art to which this invention belongs. All publications, patent applications, patents, and other references mentioned herein are incorporated by reference in their entirety. In case of conflict, the present specification, including definitions, will control.

Other features and advantages of the invention will become apparent from the description, the drawings, and the claims.

DESCRIPTION OF THE DRAWINGS

FIG. 1 is a schematic diagram showing a typical hydrocyclone.

FIG. 2A is an atomic force microscope image of ABS plastic.

FIG. 2B shows a diagram of small and large media particles on the surface of a mixed particle.

FIG. 3 shows a schematic of a multistage separation system including two hydrocyclones connected in series, where the overflow of the first hydrocyclone feeds the second hydrocyclone.

FIG. 4 is a schematic diagram of a vertically oriented cylindrical vortex separator.

FIG. 5 is a schematic of a dual precision density separation system that feeds fluid from one second stage separator to a second stage separator.

Like reference numbers and designations in the various drawings indicate like elements.

DETAILED DESCRIPTION

The invention provides density separation techniques employing particulate media having a controlled particle size distribution. When particles of media settle within a separation device such as a hydrocyclone, the density of the underflow stream is raised with respect to the feed fluid and the density of the overflow is decreased. The difference between the density of the underflow and the overflow fluid is referred to as the "differential". Because the quantity of fluid in the underflow is frequently much smaller than the quantity that reports to the overflow, the difference in density between the feed and the underflow is correspondingly much greater than the difference in density between the feed and the overflow.

The density of the fluid in which separation of the mixture particles takes place is referred to as the separation density. For example, to separate particles having densities of 1.05 g/cc and 1.10 g/cc, the separation density will be between 1.05 and 1.10 g/cc. For slurried dense media separations, the separation density is usually higher than the density of the feed fluid because the media concentrates in the underflow and prohibits some of the mixed particles that would otherwise report to the underflow from doing so. The difference between the feed density and the separation density is often referred to as the "offset". As the offset grows large, the quality of the separation generally declines.

It is difficult to precisely control the separation density for the separation of two materials that have very close densities when a large offset is present. In the case of separation of plastic materials, it is often desirable to separate two plastics that vary in density by only 0.02 g/cc or less. In many cases, the offset of a separation circuit employing a hydrocyclone and a slurried media can be as high as 0.1 g/cc. The size of this offset relative to the precise separation density cut-point (the size particle which reports to both the underflow and the overflow) required makes the separation system very difficult to control. The offset may change with time if there is variation in the particle size distribution of the media particles or a change in fluid temperature. A separation system with a small offset is desirable.

As the particle size of the media is reduced, the stability of the slurry is improved but the viscosity is generally increased. When a mixture is to be separated in a dense media separation, increasing the viscosity of the slurry slows the mixture particles as they sink or float in the separation fluid. Keeping the viscosity of the slurry low allows more mixture particles to move through the separation fluid toward the overflow or underflow. For these reasons, there is always a tradeoff in the selection of a media material because it must be neither too coarse nor too fine.

A number of different sizes of cyclones, ranging from about 76 mm (3 inch) diameter to about 760 mm (30 inch) diameter, can be used in slurried dense media separations. The effect of the particle size which reports to the overflow varies with cyclone size and other variables, as shown in Table 1 below.

TABLE 1

| Variable | Effect of variable increase on particle size to overflow |
|---|---|
| Cyclone Diameter | Increase particle size |
| Vortex Finder diameter | Increase particle size |
| Inlet Area | Increase particle size |
| Cyclone flowrate | Decrease particle size |
| Media solid density | Decrease particle size |

At a higher separation density, coarser media particles are less likely to settle because they are hindered from settling freely. At higher separation densities, coarser media particles are desirable because they result in lower media viscosity while still not producing too great an offset.

In one aspect, the present invention provides techniques for controlling the particle size of a media such that it can be used to form a slurry with beneficial properties when used to sort a mixture of solids in a centrifugal fluid separation device. To ensure that a media performs reliably once it has been prepared, the media is classified such that small and large particles outside of a selected range or particles of dissimilar materials are removed from the media before the media is used in a separation process. These techniques produce cleaner mixture particles because fine media particles that tend to adhere to surfaces of the mixture particles are removed and because the media abrasively cleans the outer surface of the material. The techniques can be used to separate mixed plastics, but they are also applicable to the separation of mixtures of metals or minerals, or any mixture of materials that can be segregated according to density. Generally, the size of the particles of media is less than 50% of the average size of the mixture particles that are to be separated. In one method in accordance with the invention, a separation media to be used in a particulate material separation system, such as a hydrocyclone or cylindrical vortex separator, is selected to have a particle size distribution within a specific particle size range. The classified media is prepared by passing a slurry of unclassified particulate media in a carrying fluid through a density separator, such as a hydrocyclone. The media includes a particulate material, which can be a mineral such as magnetite, titanium dioxide, sand, ferrosilicate, or other mineral, or other non-mineral material. The carrying fluid is usually water, water with a dissolved salt, or other liquid. Generally, hard media particles are selected for their ability to resist abrasion during the separation process.

In one embodiment, the density separator used to classify the media is the same separator in which the media will be used to separate a mixture of materials. Alternatively, the media can be processed in a different separator, such as a separator having equivalent or similar classification conditions. A coarse fraction of the media containing particles larger than a first predetermined particle size threshold is produced in the density separator and is removed, and the remaining portion of the material is retained. For example, where the media is processed in a hydrocyclone separator, a coarse fraction of the media is produced at the underflow or apex of the cyclone and is removed, and the portion of the medial material reporting to the overflow is retained, as will be described in more detail below.

This process can be repeated one or more times, with the retained material being fed into the same or a different density separator to remove additional fractions of coarse material. While a single pass to remove coarse particles is often sufficient to greatly reduce the separator offset, a second or third pass can provide additional reduction in the offset that is experienced when the media is subsequently used in a dense media separation under the same separation conditions, making it possible to more precisely separate the mixture. Alternatively, the flow rate can be increased while the coarse fraction is being removed.

Fine particles smaller than a second predetermined size threshold are then removed. The retained material from which the coarse fraction has been removed is fed into a density separator, which can be the same separator in which the coarse particles were removed, or a different separator. In this separator, very fine media particles smaller than the smaller size threshold are separated from the slurry, and an acceptable media—that is, a media having a particle size distribution in the desired range—is produced. For example, the fine classification can be performed in a separate rinse hydrocyclone that is configured such that it precipitates a much smaller diameter particle than the generally larger hydrocyclones used for removal of the coarse fraction of the media (and separation of the mixture), as will be described in more detail below. This hydrocyclone produces an overflow fluid fraction that contains only very fine media particles and concentrates the remaining, acceptable media from the slurry in an underflow fraction that can be returned to the main separation feed tank.

The particular media particle size range (that is, the first and second particle size thresholds discussed above) selected for a given separation will vary from one separation to another, depending both on the media material and on the equipment forming the separation circuit. A simple method can be employed to determine the coarse size threshold above which media particles will be removed. As discussed above, a hydrocyclone separation system can process the unclassified media so that the coarse fraction which reports to the underflow can be removed. Each consecutive pass through the cyclone will enable removal of a coarse fraction of the remaining solid media. If too great a number of passes is used eventually nearly all of the particulate media will be removed. Consequently, between one and five passes typically achieves most or all of the anticipated practical benefit without substantially diminishing the yield of acceptable media. By performing a preclassification step using the intended separation system and conditions on only the slurried media, this behavior can be used to eliminate media particles that will settle under the separation conditions, thus yielding a media substantially free of coarse particles that will settle to the underflow and adversely impact the resulting separation performance, even though the quantity and characteristics (i.e., the coarse particle size threshold) may be unknown. In general, the appropriate particle size of the media will depend on the density of the media. For example, magnetite media between 5 and 30 microns forms a stable slurry. Other minerals or media particles that are less dense than magnetite, such as silicon dioxide, form a stable slurry with coarser particles.

Removing substantially all particles below a certain particle size and above a certain particle size generally improves the separation of particles in a mixture, as will be described in more detail below. The particular particle size distribution selected for the media varies with the choice of media material and configuration of the separation system and is usually described by the classification technique used to achieve the particle size.

Removal of particles smaller than the target range avoids several problems in separations performed with the media. For example, fine particle size material can lead to the formation of substantial levels of foam while handling the fluid that contains the slurried particles. Fine media particles also cause the observed viscosity of the slurry to increase, which makes it more difficult for mixture particles to rise or settle with respect to the fluid within the centrifugal separation device. Fine media particles are also more likely to become airborne if allowed to dry and can be problematic for maintaining plant cleanliness and hygiene. Fine media particles also contaminate the surface of some varieties of particles to be separated, particularly plastics.

Surface contamination by fine particles can be particularly problematic. FIG. 2A illustrates an atomic force micrograph of the surface of a microtomed section of an injection molded acrylonitrile butadiene styrene (ABS) plastic specimen. The atomic force microscopy was performed in the normal tapping mode. The atomic force micrograph in FIG. 2A shows surface holes and contours of several different sizes. Holes 205 from pigment particles are seen to be generally less than 2 microns, rubber domains 210 within the ABS are generally less than 0.5 microns and surface grooves and contours are generally less than 5 microns. Though the contours in the AFM are from a microtome it may be concluded that plastic granulation would also produce similar contours. As shown in FIG. 2B, media particles 215 with sizes greater than 5 microns are substantially less likely to be able to find a location at which to adhere to the surface, while a media particle less than 5 microns, such as a media particle 220 that is 3 microns in diameter, may be able to fit into a 3 micron void 225. Thus, a particulate media used in a slurry to sort mixture particles which contains a greatly reduced number of media particles less than 5 microns should be less likely to contaminate the plastic surface. Washing samples of plastic in slurries which contain greater and lesser amounts of media particles less than 5 microns demonstrates that the plastics washed with slurries with particles smaller than 5 microns have higher contamination rates than plastics washed with slurries including particles greater than 5 microns. The fewer fine media particles present, the less the slurry tends to contaminate the plastic surface.

There are a number of separation techniques, such as triboelectrostatic separation and froth flotation, that rely on a clean plastic surface. By stripping fine particles less than 5 microns from a slurried density separation media, the performance of triboelectric charging is greatly enhanced, because of the media does not contain particles that adhere to the surface of the mixture particles (and thus does not alter the behavior of the mixture particles in the separation device), and the abrasive cleaning that coarse media particles perform.

When an abrasive material, such as magnetite, titanium dioxide, sand, ferrosilicate, or other hard material is the media and the media has a particle size coarser than 5 microns, surface abrasion of polymeric mixture particles (e.g., plastics) occurs. The particles have a less glossy appearance after being subjected to a slurried dense media separation and fine plastic is present in the waste material that is removed from the wet separation system. This abrasion action has the effect of cleaning the surface of the polymers and so improves their performance in surface based separation techniques, such as triboelectric separation, since surface contaminants can modify the properties of mixture particles such that particles with the same physical attributes behave differently during the separation. The cleaning is particularly enhanced by the use of slurried dense media where the particle size distribution minimizes the content of fine (<5 micron) material, because finer materials coat the surface of the mixture particles and can prevent abrasion as discussed above. Thus, exposing a plastic mixture to a slurry classified to exclude particles smaller than 5 microns before the mixture is sorted using a surface based separation technique can improve the resulting separation.

Media particles coarser than the selected particle size are also problematic because they settle in the process equipment, particularly in centrifugal separation devices where settling occurs quite rapidly. If media particles of the slurry settle to a large degree in the centrifugal separator, the density at which the mixture particles are separated is altered. The more slurry particles settle, the more the effective separation density is raised and the less precise separation will be.

The density at which the separation occurs in a density separator tends to be close to the density of the separator's underflow. For any given centrifugal separator operated at a given separation condition, there will be a particle diameter which is distributed evenly between the overflow and underflow. Increasing the flow rate causes the particle diameter that reports to both the underflow and overflow to reduce. As an example, if the flow rate of fluid through the hydrocyclone is doubled, the size of particle that distributes evenly decreases because the centrifugal forces within the cyclone increase.

In another aspect, the invention provides separation systems, and methods of using such systems, that reduce the total amount of equipment required to both prepare slurried media and perform slurried media density separations. The equipment can be run in two discreet modes. The first mode creates a media having a controlled particle size distribution. The second mode separates the mixture of plastics, plastics and other materials, metals, or minerals using the particulate media to adjust the density upward from the inherent density of the carrying fluid.

In one embodiment, the media is prepared by passing a slurry of unclassified media through the same hydrocyclone (or a different hydrocyclone with equivalent classification conditions) used for separating mixtures of coarse (1–25 mm) particles, such as mixed plastics. The density of the slurry can be a density that is between at least two of the materials in the mixed particles to separate. For example, most plastics have a density between 0.9 and 1.3 g/cc. Thus, the density of the slurry can be selected (based, e.g., on the addition of media) to fall within the 0.9 to 1.3, or narrower range of 1.01 and 1.15 g/cc. A coarse fraction of the media is produced at the underflow or apex of the cyclone. The coarse fraction is removed and the portion of the media material reporting to overflow is retained. By repeating this operation, it is possible to selectively reduce the offset that is experienced when the media is used in a dense media slurry separation under the same hydrocyclone conditions. A single pass is often sufficient to greatly reduce the offset.

However, a second or third pass is desirable, particularly if a precise mixture separation is desired. As an alternative to multiple passes, the flow rate can be increased while the coarse fraction is being removed. Increasing the volumetric flow rate through a hydrocyclone increases the capture of coarse particles in the underflow and reduces the average particle size remaining in the overflow.

The particles that report to underflow in a slurried dense media circuit tend to be the coarser particles in the media. If these coarser media particles are removed when the media is being prepared, it is possible to greatly reduce the offset of the separation circuit. In addition, by removing media particles that are below a determined size, the media will exhibit a reduced viscosity, reduced foaming, reduced propensity to contaminate surfaces and increased propensity to abrasively clean surfaces, further improving the performance of separations performed with the media.

With each consecutive pass and removal of a remaining coarse fraction, the slurry retained becomes more stable. This means that the media will separate mixtures at a density closer to that of the feed density (smaller separation offset) and the overflow stream will have a density more nearly approaching that of the underflow (low differential). If the media is stabilized by the sequential removal of coarse particles, a two-stage separation can be carried out by direct connection of the first cyclone 305 overflow 310 to the feed 315 of the second hydrocyclone 320, as shown in FIG. 3.

A two-stage serial connection allows a second separation to occur in the second hydrocyclone to further separate the media particles into narrower size ranges. If the separation removes 90% of a given density of particle from the overflow each time it passes through the hydrocyclone, a second separation of the overflow has the effect of removing 90% of the remaining material for a net removal of 99%. When used in a dense media slurry separation, connecting the overflow of the first hydrocyclone to the feed of the second cyclone results in the separation in the second hydrocyclone taking place at a lower density than the separation in the first, since the overflow of the first cyclone contains more water and is less dense than the feed. The difference in separation density diminishes as the media becomes more stable (a salt water media is quite stable and would result in little difference in separation density). Directly connecting the underflow of a first hydrocyclone to the feed of a second hydrocyclone typically restricts the entry of air into the cyclone apex to form an air core inside the cyclone. The air core improves separation and thus, direct connection can compromise the separation that occurs in the first hydrocyclone.

A slurried particulate solid media can be stabilized for use in a separator system such as that in FIG. 3 by first passing the slurry through the system and removing the portion of the media that reports to underflow. The system can be designed to allow valves to redirect the two cyclone underflows to storage only during media classification. Once the media has been prepared, all media from both underflows and the overflow is returned to the separation feed tank. As an alternative to direct connection of the overflow of one hydrocyclone to another, it is possible to elevate the first hydrocyclone and to allow the overflow to feed a headbox at atmospheric pressure. The headbox is located above the second hydrocyclone by approximately 10 diameters of the second cyclone, which is a sufficient head height to drive many separation cyclones. For example, if the second hydrocyclone is a 24.5 cm diameter cyclone, the headbox, which drives it, would be approximately 10×25.4 cm or 254 cm above the cyclone inlet. This configuration has the advantage of not providing additional pressure to the underflow of the first cyclone that may drive more fluid than is desired out the first underflow. It also allows the formation of an air core in the first cyclone that increases separation performance. However, this headbox configuration requires a great deal of vertical height—in the case of a 38 cm diameter cyclone, almost 4 meters of additional vertical clearance would be required for installation of such a system.

A practical difficulty of feeding hydrocyclones with overflows in series is that a high pressure is required and pumps capable of handling both abrasive and coarse solids tend not to be well suited to the high pressures required to drive multiple stages. This is true whether the hydrocyclones are directly connected or connected via a headbox. This difficulty may be overcome if, instead of a hydrocyclone, a cylindrical vortex separator as described in U.S. Pat. No. 6,238,579 is used. This device has the advantage of requiring much less pressure to drive the separation. As little as 1.5 meters of vertical distance is needed to drive a cylindrical vortex separator with a flow rate equivalent to the rate found with a 38 cm hydrocyclone. This 1.5 meters is measured from the heavy product exit port, which may be placed at the bottom of the separator. If the cylindrical vortex separator is oriented vertically and is 1 meter in length, the outlet of the first hydrocyclone can be positioned 0.5 meters above the top of the cylindrical vortex separator. One example of a vertically oriented cylindrical vortex separator is shown in FIG. 4. The feed material enters headbox 405 and is fed to the cylindrical vortex 400, where the separation process causes the heavy product to exit at port 410 while the light product exits a second port 415. Distance 420 is measured from the headbox 405 to light port exit 415.

The combination of a hydrocyclone overflow feeding a headbox which feeds a cylindrical vortex separator enables a much more practical two-stage separation as both the vertical clearance and the pressure requirement of the pump are greatly reduced. This configuration has another advantage in that the cylindrical vortex separator delivers between 60 and 90% of feed fluid to the heavy product, whereas a hydrocyclone delivers between 60 and 90% of the fluid to the light product. The cylindrical vortex separator thus acts as a dewatering unit for light products just as hydrocyclones are used as a dewatering device for heavy products. If a hydrocyclone delivers the heavy product from a wet separation unit and its overflow is sent to a cylindrical vortex separator that delivers a light product from the unit and recirculates the heavy product to the feed tank, approximately half of the fluid sent through the system does not require dewatering to capture solids. This represents a significant cost savings by simplifying the dewatering screener and potentially simplifying the rinse system required. If a hydrocyclone with its overflow feeding a cylindrical vortex separator via a dewatering box is used on a water only separation system, both heavy and light products may be sent directly to spin dryers if plastic materials are being processed and a separate dewatering unit is not required before the spin dryer. This two-stage system requires only approximately 1 meter more vertical clearance than a single stage system. While the two-stage system requires a slightly higher pressure on the pump, it yields a substantially more precise separation when compared to a single stage system.

If the overflow from a first cyclone is sent to a second cyclone and a slurried particulate media is used which has not had the coarse particles removed in a pre-classification stage, the separation in the first cyclone takes place at a higher density than the separation in the second cyclone since the coarse particles in the slurry tend to report to the underflow of the first separator. If a density monitoring device is placed on the inlet to the second cyclone, a very precisely controlled separation can be made in the second cyclone. The separation which takes place on the first cyclone is less precise because the coarse media precipitates in this stage (resulting in a high differential and offset).

If a pre-classified media is used but a very coarse media fraction (such that the first cyclone captures substantially all of it) is added back to the feed tank, a first stage separation which removes heavy impurities (such as rubber, metal, PVC and circuit boards from mixed plastics) can precede a second stage separation at a very precise and lower density. For example, if a mixture of particles contains three polymer types, A, B and C, having densities of 1.20, 1.11 and 1.09 g/cc, respectively, a classified media having a very coarse media fraction added can be used to produce a three-way separation. The mixture of particles and media (including the added very coarse fraction) is introduced into a first cyclone, where the most of densest polymer A and substantially all of the very coarse media particles report to the underflow. The overflow, which includes less dense plastics B and C., This overflow, which now consists of less dense plastics B and C in the original classified media is fed into the second cyclone, where the B particles now report mostly to the underflow and the C particles report mostly to the overflow. The two cyclone system has separated the mixed particles into three streams of A, B and C polymers. The same method can be used to separate out heavy impurities (such as rubber, metal, PVC and circuit boards from mixed plastics) in the first cyclone and separate two polymers types or grades in the second cyclone. One method of altering the density of the separation is to restrict the apex of the first cyclone. When the apex is restricted, the quantity of water which flows to underflow is reduced, but (within limits) the recovery of very coarse solids is not substantially diminished.

Using this approach, a single separation unit can perform cyclonic separations at two different densities simultaneously (i.e., the lighter fraction containing less dense polymers A and B can be fed back into the first cyclone in the example described above), with the second separation occurring at a lower density and more precisely separating the mixture particles. Three products are produced: the high density heavies, the middle range density bracketed product, and the lower density lights.

In one embodiment, the classification media can be regenerated after it has been used in one or more density separations by subjecting the slurry containing the media to the same classification conditions that were originally used to classify the media to generate a controlled particle size distribution. In this way, fine and coarse particles generated or introduced during the course of one or more separations—for example, fine particles generated by abrasion of larger media particles during mixture separations, or coarse particles introduced as contaminants—can be removed and the usefulness of the media can be maintained over multiple separations.

If a two-stage separation is desired, separators can be fed by the overflow 510 and the underflow 515 from the first stage separation cyclone 505, as shown in FIG. 5. As described above, when a hydrocyclone is used, underflow 515 from first stage separator 505 includes less water than feed fluid 520 into first stage separator 505 such that the density of underflow 515 is considerably higher than the density of feed 520. Overflow 510 has more water than feed fluid 520 and is thus less dense, but the density of overflow 510 differs less from the density of feed 520 than does the density of underflow 515. This causes feed 520 into the first stage and overflow-fed separator 525 to differ from feed 530 into underflow-fed separator 535. In this arrangement, there is generally not enough fluid flow to drive underflow-fed separator 535. To solve this problem, fluid can be removed from overflow 540 of second stage overflow-fed hydrocyclone 525, for example, with dewatering screen unit 545, and the liquid can be added to the feed of underflow-fed separator 535 to correct the underflow-fed feed density.

When the second stage overflow-fed separator is a cylindrical vortex separator, a dewatering screen unit can be placed on the underflow discharge from the second stage overflow-fed separator to equalize the density and allow sufficient flow for the three feeds.

The fluid removed with this dewatering box is sent to the headbox for the second stage underflow-fed separator. Adding this fluid supplements the feed into the underflow-fed separator and enables the second stage underflow unit to operate, particularly if a slurried dense media is used as the separation fluid. If no fluid is added to the second stage underflow-fed separator, the separation density at the second stage underflow-fed separator is higher than in the first stage separator and the underflow-fed separator. Thus, the fluid from the large volume discharge of the second stage overflow-fed separator corrects the density of the feed into the second stage underflow-fed separator and allows a second separation stage at the same or similar density as the first stage separator. No correction is needed for the second stage overflow if the first separator is a hydrocylone, because the majority of fluid flows from the first stage to this unit in any case. A de-watering screener unit actually removes fluid as opposed to merely removing water. This fluid contains the density adjusting slurried media which has a much finer particle size than the openings on a standard dewatering screener. The openings on such a dewatering screener are generally larger than 1000 microns.

The second stage separators used in the process described above can be cylindrical vortex separators. If a hydrocyclone is used as the second stage overflow-fed separator, the water from the overflow of this separator can be de-watered and sent to the headbox of the second stage underflow-fed separator. Thus, the second stage underflow separator can either be a hydrocylone or a cylindrical vortex separator.

As discussed above, a hydrocyclone reports a majority of fluid to the overflow, while a cylindrical vortex separator reports a majority of the feed fluid to the underflow. If the first stage separator is a cylindrical vortex separator or other centrifugal separator that delivers a higher fraction of fluid to the underflow, the fluid from the higher volume discharge stream from the second stage underflow-fed separator can be sent to the head box of the second stage overflow separator. Regardless of the separator used at the first and second separation stages, one pump can be used for the entire multistage process. By contrast, conventional separation processes typically require one pump required for each separator, increasing the cost and complexity of the separation equipment.

In order to conserve the particulate media, it is generally rinsed off the exiting particles of the mixture. The mixture particles can be rinsed on a screen including a first portion that functions as a "dewatering" section. The fluid from the dewatering section can be sent back to the separation tank for direct reuse. A portion of this screened fluid can be diverted to a rinse water system. The rinse water system includes a separate tank to capture the diverted fluid and deliver it to a rinse pump. The rinse pump can pressurize the fluid and feed a separate hydrocyclone that is configured such that it precipitates a much smaller diameter particle than is used with the generally larger hydrocyclones for separation of the mixture and potentially for removal of the coarse fraction of the media. The rinse hydrocyclone can be used to accomplish several functions. It precipitates an acceptable media from the slurry and creates an overflow fluid fraction which contains only very fine media particles and an underflow fraction which concentrates the mediated fluid for return to the main separation feed tank, returning the media to the process. The rinse water can be used to spray the mixture particles in order to liberate more of the media from the wet solids.

This rinse water system is also a convenient way to control the density of the fluid in the main separation unit. If the density is found to be too low, a portion of the rinse water can be diverted from the process to concentrate the fluid in the tank. If the density of the main separation fluid is too high, a portion of the underflow can be diverted from the process to dilute the separation fluid.

The rinse cyclone can also be used to remove media that is too fine (generally under approximately 5 microns for magnetite slurries) during media classification, as discussed above. The diversion system can be used to send the overflow from an unclassified media to a settling system. This diversion system can be automatically activated if a density monitor (such as a nuclear density meter) is placed on the rinse cyclone overflow. If the overflow density is above a given point (approximately 1.01 g/cc for example) the overflow is automatically diverted and fresh rinse water is substituted. This substitution does not take place if the main separation fluid loop density monitor indicates that the fluid is too dilute.

Using this simple system, the character of the media can be controlled and maintained and the density of the main separation loop can be maintained. This has substantial advantages over more expensive magnetic media concentration systems designed to concentrate only ferromagnetic particles for recovery since particles are concentrated by size. The rinse water controlled system enables the use of any particulate solid as a media regardless of its magnetic properties.

The media may be initially classified using this straightforward approach and tuned to remove problematic fine materials. The same equipment can then be used to continuously remove fines which are created by the process or are added to the system by the feed. This allows for regeneration and reuse of the slurry. The use of a rinse spray substantially increases the recovery of slurry particles and reduces abrasion damage to downstream equipment. The mixture particles, if they are plastic, are sent to a variety of centrifugal dryer called a spin dryer which includes a central rotating paddle arrangement inside a stationary screen cylinder. The screen cylinder is oriented with its axis vertical.

EXAMPLES

The following examples are illustrative only and are not intended to limit the scope of the invention described in the claims.

Example 1

Effect of Media Particle Size on Surface Contamination of Plastic

Magnetite with a particle size distribution ranging from 0.1 to 100 microns was placed in water and stirred. The slurry was allowed to settle for a few minutes and the supernatant fluid was poured into a second beaker. This slurry was allowed to settle for a few minutes and the supernatant fluid was poured into a third beaker. Each beaker contained either a coarse, mid or fine media size fractions.

Approximately ten grams of polypropylene plastic pellets were stirred in each of the three slurries for about one minute. Then the pellets were removed, rinsed and dried in an oven. The pellets stirred with the fine particle slurry appeared noticeably darker than the pellets stirred with the coarse or mid magnetite slurries.

The charge on the dried pellets was then measured after swirling in a polycarbonate container. Table 2 shows the charge per mass on the pellets exposed to water, fine and course particles. The charge is less for the pellets exposed to fine particles, suggesting some effect of surface contamination.

TABLE 2

Charge per mass of dried polypropylene pellets after exposure to water, fine magnetite media and coarse magnetite media

| sample | charge per mass (nC/g) |
| --- | --- |
| water only | −0.36 |
| fine media | −0.17 |
| coarse media | −0.34 |

Example 2

A 15 inch D15B model Hydrocyclone manufactured by Krebs Engineers, Tucson, Ariz. with a 6 inch vortex finder, an 11 square inch inlet and a 4.5 inch apex is fed at a pressure of approximately 7 psi magnetite, removing particles with a diameter above approximately 30 microns. Alternatively, additional particles, down to approximately 25 microns can be removed to create a very closely sized 5–25 micron media by repeatedly processing or decreasing the separation cut-point by increasing the feed rate or changing another cyclone separation parameter, as described in Table 1. The hydrocyclone is oriented at approximately 22 degrees from the horizontal. The hydrocyclone distributes approximately half of 30-micron particles to the underflow with a higher percentage of coarser particles to the underflow. Approximately 30–40% of the total fluid is sent to the underflow, thus a particle with only 30–40% recovery to underflow would not be effectively classified because it reports with the fluid and is not acted upon by the cyclone.

Example 3

Another example of selecting the media size follows. A model D4B-12 hydrocyclone manufactured by Krebs Engineers with a 1.2 square inch inlet area, a 1.25 inch vortex finder, and fed at a pressure of approximately 30 psi is expected to recover approximately half of the 10 micron particles of a magnetite slurry to underflow. With an apex diameter of 0.625 this cyclone sends approximately 10 percent of the total fluid to underflow. Thus, it concentrates the particles coarser than 10 microns substantially and can have very little ability to capture 5 micron and smaller particles in the underflow. Approximately 10% of all smaller particles are delivered to underflow because they travel with the fluid that reports to underflow. With each pass a fraction between 50 and 90 percent of all particles below 10 microns is removed from the media reporting to underflow. With 1–5 passes through the cyclone, the magnetite recovered to underflow would be substantially free of particles 5 micron and under.

The invention has been described in terms of particular embodiments. Other embodiments are within the scope of the following claims. For example, steps of the invention can be performed in a different order and still achieve desirable results.

What is claimed is:

1. A method for separating a mixture, the method comprising:
    performing one or more coarse classification separations on a slurry including a separation liquid and one or more particulate media materials, wherein performing the one or more coarse classification separations separates from the slurry a coarse fraction containing coarse particles of the one or more media materials, the coarse particles having a particle size greater than a first particle size threshold;
    performing one or more fine classification separations to separate from the slurry a fine fraction containing fine particles of the one or more media materials, the fine particles having a particle size less than a second particle size threshold, wherein the one or more coarse classification separations separating from the slurry a coarse fraction and the one or more fine classification separations to separate from the slurry the fine fraction produce a classified media having a controlled particle size distribution of the particulate media materials;
    combining the classified media with a mixture to be separated to generate a separation mixture, wherein the mixture to be separated includes plastic; and
    performing one or more density separations on the separation mixture;
    wherein performing the one or more coarse classification separations on the slurry and the one or more fine classification separations on the slurry or performing the one or more density separations on the separation mixture, comprises:
        separating the slurry or the separation mixture in a first density separator to generate a first fraction and a second fraction;
        separating the first fraction in a second density separator to generate a third fraction;
        recovering liquid from the third fraction;
        combining the recovered liquid and the second fraction; and
        separating the second fraction in a third density separator.

2. The method of claim 1, further comprising:
    regenerating the classified media by performing a classification separation of the media after performing at least one density separation of the one or more density separations on the separation mixture.

3. The method of claim 1, further comprising:
    regenerating the classified media by performing a classification separation of the media after performing at least one density separation of the one or more density separations on the separation mixture, including removing particulate material from the classified media having a particle size smaller than a fine size particle threshold.

4. The method of claim 1, further comprising:
    before performing a first density separation of the one or more density separations on the separation mixture, adding a very coarse fraction of the one or more media materials to the mixture, the very coarse fraction containing media particles that substantially report to separator underflow.

5. The method of claim 1, wherein:
    the first particle size threshold and the second particle threshold are determined by parameters of a separation system.

6. The method of claim 1, wherein:
    performing one or more coarse classification separations on the slurry, performing one or more fine classification separations or performing one or more density separations on the separation mixture includes separating the slurry or the separation mixture using one or more hydrocyclone separators.

7. The method of claim 1, wherein:
    performing one or more coarse classification separations on the slurry, performing one or more fine classification separations or performing one or more density separations on the separation mixture includes separating the slurry or the separation mixture using one or more cylindrical vortex separators.

8. The method of claim 1, wherein:
    performing one or more coarse classification separations on the slurry, performing one or more fine classification separations or performing one or more density separations on the separation mixture includes separating the slurry or the separation mixture using one or more hydrocyclone separators and one or more cylindrical vortex separators.

9. The method of claim 1, wherein:
    performing one or more coarse classification separations on the slurry, or performing one or more fine classification separations includes separating the slurry using an arrangement of one or more density separators; and
    performing one or more density separations on the separation mixture includes separating the separation mixture using the arrangement of one or more density separators.

10. The method of claim 1, wherein:
    the one or more particulate media materials include one or more of magnetite, titanium dioxide, sand or ferrosilicate.

11. The method of claim 1, wherein:
    the one or more particulate media materials include magnetite and the classified media includes magnetite particles having a particle size distribution in the range from about 5 to about 30 microns.

12. The method of claim 1, wherein:
    the one or more particulate media materials include magnetite and the classified media includes magnetite particles having a particle size distribution in the range from about 5 to about 25 microns.

13. The method of claim 1, wherein:
    separating the first fraction in a second density separator includes generating the third fraction and a fourth fraction, the third fraction including a larger amount of liquid than the fourth fraction.

14. The method of claim 1, wherein:
    the first density separator is a hydrocyclone and the second and third density separators are cylindrical vortex separators.

15. The method of claim 1, wherein:
    the first density separator is a cylindrical vortex separator and the second and third density separators are hydrocyclone separators.

16. The method of claim 1, wherein the steps of separating the slurry or the separation mixture in a first density separator, separating the first fraction in a second density separator and separating the second fraction in a third density separator include operating a single pump that is coupled to the first, second and third density separators.

17. The method of claim 1, wherein recovering liquid from the third fraction includes sending the third fraction to a dewatering screener coupled to an exit port of the second density separator.

* * * * *